No. 611,528.　　　　　　　　　　　　　　　　Patented Sept. 27, 1898.
E. SUTTER & T. REYNOLDS.
SAFETY HITCHING DEVICE.
(Application filed July 31, 1897.)

(No Model.)

Witnesses　　　　　　　　　　　　　　　　Inventors
C. W. Bradway.　　　　　　　　　　　　　Errolled Sutter.
Victor J. Evans.　　　　　　　　　　　　Thomas Reynolds.
　　　　　　　　　　　　　by John Wedderburn Attorney

UNITED STATES PATENT OFFICE.

ERROLLED SUTTER AND THOMAS REYNOLDS, OF REYNOLDSVILLE, PENNSYLVANIA.

SAFETY HITCHING DEVICE.

SPECIFICATION forming part of Letters Patent No. 611,528, dated September 27, 1898.

Application filed July 31, 1897. Serial No. 646,667. (No model.)

*To all whom it may concern:*

Be it known that we, ERROLLED SUTTER and THOMAS REYNOLDS, citizens of the United States, residing at Reynoldsville, in the county of Jefferson and State of Pennsylvania, have invented certain new and useful Improvements in Safety Hitching Devices; and we do hereby declare the following to be a full, clear, and exact description of the invention, such as will enable others skilled in the art to which it appertains to make and use the same.

This invention relates to a safety hitching device for vehicles; and it consists of the construction and arrangement of the several parts which will be more fully hereinafter described and claimed.

The object of the invention is to apply a device in connection with a vehicle to which the reins may be attached and form a secure means for hitching the animal automatically and at the same time block one of the wheels and also produce a check upon the animal in the attempt to turn or move from the position in which it is desired he shall remain.

In the accompanying drawings, Figure 1 is a perspective view of a portion of the rear part of a vehicle, showing the improved device applied thereto. Fig. 2 is a bottom plan view of a portion of the mechanism. Fig. 3 is a longitudinal section of the device as shown in Fig. 1.

Referring to the drawings, wherein similar numerals of reference are employed to indicate corresponding parts in the several views, the numeral 1 designates a vehicle of any suitable form having running-gear 2. On one of the wheels 3 is mounted a band or collar 4, having sprocket-stubs 5, projecting outwardly therefrom, three of these being preferably used, but the number may be varied as desired. Adjacent to the said wheel 3 and pivoted to a clip 3ª on an adjacent part of the axle is a bell-crank lever 6, having a double bend at opposite points, and on the free end of the rearwardly-projecting arm thereof is formed an engaging tongue 8, provided with an angular shoulder or drop 9 to accommodate the free operation of the said tongue and permit it to clear the hub. To the forward end of the remaining arm of the bell-crank lever the rear end of a connecting rod or bar 10 is movably attached, the said bar being bent to elevate it at the front and depress it at the rear for convenience in attachment to the several parts to which it is applied. To the front end of the said connecting rod or bar is movably attached the lower end of a lever 11, having bearing in a suitable stirrup 12, carrying a fulcrum 13, and an adjacent stop 14, limiting the rearward movement of the said lever 11. The said lever passes upwardly through a slot 15 in one side of the bottom of the vehicle, and to the upper end of said lever the rear end of an arm 16 is movably connected and has a front hook 17, in rear of which is a vertically-positioned guard 18.

When not in use, the arm 16 may be lowered below the upper edge of the vehicle-body and rest upon the bottom of said body, which operation is accomplished by dropping the arm 16 on the bed of the vehicle. When it is desired to use the device, the said arm 16 is thrown forwardly, and upon leaving the vehicle the occupant will attach the driving-reins to the hook 17 by means of suitable rings carried by the said reins, the guard 18 preventing the said rings from moving backwardly too far on the arm. In the event of the horse or animal attached to the vehicle starting or moving forwardly a tension is exerted on the arm 16, which pulls the upper end of the lever 11 toward the front of the vehicle and shifts the connecting rod or bar 10 rearwardly and through the bell-crank levers 6, the engaging tongue 8 being thrown over the hub of the wheel and between two sprocket-stubs 5 and thereby immediately instituting a check by blocking the wheel carrying the said stubs. The wheel may have slight movement before it becomes fully locked; but the check is soon appreciated by the horse, and if he again starts forward the connecting rod or bar 10 is forced toward the front of the vehicle and pulls the arm 16, with the same result as before specified, thereby tightening the driving-reins. This tension on the driving-reins will cause the horse to back, and finding that a resistance is offered to movement in both directions the horse will be affected the same as if attached to an ordinary hitching-post or analogous device.

The rings to be used upon the driving-reins are at equal distances apart or primarily positioned to derive the best results, and if the horse attempts to turn to one side when the reins are in engagement with the hook 17 he tightens the rein on one side and brings himself around straight. This operation will of course ensue in a similar manner when the horse turns toward the opposite side. On the return of the occupant to the vehicle and in taking up the reins or releasing them from the hook 17, the parts now being free, the first movement of the vehicle throws the said parts to their normal position, or so that the engaging tongue 8 is released from the sprocket-stubs 5, as no resistance is offered to self-adjustment in this manner.

A further advantage of the attachment is that in going up hill the wheel may be locked when it is desired to block and prevent the vehicle from running backwardly. Other operations might be attained, and these will be regulated by the positions of the several parts and their dimensions relatively to each other,

Having thus described the invention, what is claimed as new is—

In a device of the character set forth, the combination with a wheel of a vehicle, of a band or collar on the hub thereof provided with sprocket-stubs, a bell-crank lever mounted on the adjacent axle and having the rear arm thereof at the free end formed with a shouldered engaging tongue, an arm located within the vehicle-body, and having a front hooked end with a guard adjacent thereto adapted to receive the reins, a lever to which the said arm is pivotally attached, and a connecting-rod between the lower end of the said lever and the said bell-crank lever, said lever to which the arm is attached being mounted in a stirrup and having a limiting-stop.

In testimony whereof we have signed this specification in the presence of two subscribing witnesses.

ERROLLED SUTTER.
THOMAS REYNOLDS.

Witnesses:
ALBERT REYNOLDS,
C. MITCHELL.